US006622210B2

(12) United States Patent
Hori (10) Patent No.: US 6,622,210 B2
(45) Date of Patent: Sep. 16, 2003

(54) MICROCONTROLLER WITH IMPROVED ACCESS EFFICIENCY OF INSTRUCTIONS

(75) Inventor: Yasuyuki Hori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 169 days.

(21) Appl. No.: 09/790,698

(22) Filed: Feb. 23, 2001

(65) Prior Publication Data

US 2002/0053005 A1 May 2, 2002

(30) Foreign Application Priority Data

Oct. 31, 2000 (JP) ........................................ 2000-332320

(51) Int. Cl.$^7$ ............................. G06F 12/00; G06F 13/00
(52) U.S. Cl. ........................ 711/125; 710/107; 710/305
(58) Field of Search ................................. 711/123, 125, 711/129, 158; 710/100, 107, 113, 114, 115, 305, 316

(56) References Cited

U.S. PATENT DOCUMENTS 6,345,335 B1 * 2/2002 Flynn ......................... 711/123

* cited by examiner

Primary Examiner—Matthew Kim
Assistant Examiner—Woo H. Choi
(74) Attorney, Agent, or Firm—Staas & Halsey LLP (57) ABSTRACT

A microcontroller is provided which has a structure installable in a conventional circuit configuration including a cache memory without any modification and allows a central processing unit to access the cache memory in one cycle. The microcontroller includes a central processing unit, a bus control unit connected to the central processing unit through an instruction bus and a data bus provided independently, a memory interface circuit receiving the instruction bus and a memory bus extending from the bus control unit and controlling an instruction access via the instruction bus and a data access via the memory bus, and a memory subjected to the instruction access and the data access via said memory interface circuit. Thus, the instruction access to the memory can be performed in the same manner as that of an instruction access to an instruction cache memory. Thus, the cache hit surely occurs for each instruction access, so that the access efficiency can be enhanced.

6 Claims, 9 Drawing Sheets

MICROCONTROLLER WITH IMPROVED ACCESS EFFICIENCY OF INSTRUCTIONS

BACKGROUND OF THE INVENTION

1. Field of the Invention

The present invention relates to microcontrollers, and more particularly to a microcontroller having an improved access efficiency of an instruction with respect to a memory.

2. Description of the Related Art

The recent development of system LSI (Large-Scale Integration) has stimulated demand for memory-logic hybrid LSI devices. The enhanced performance of consumer products equipped with these LSI devices has necessitated increase in the speed of circuit and efficiency of execution of a program.

Figure 6:
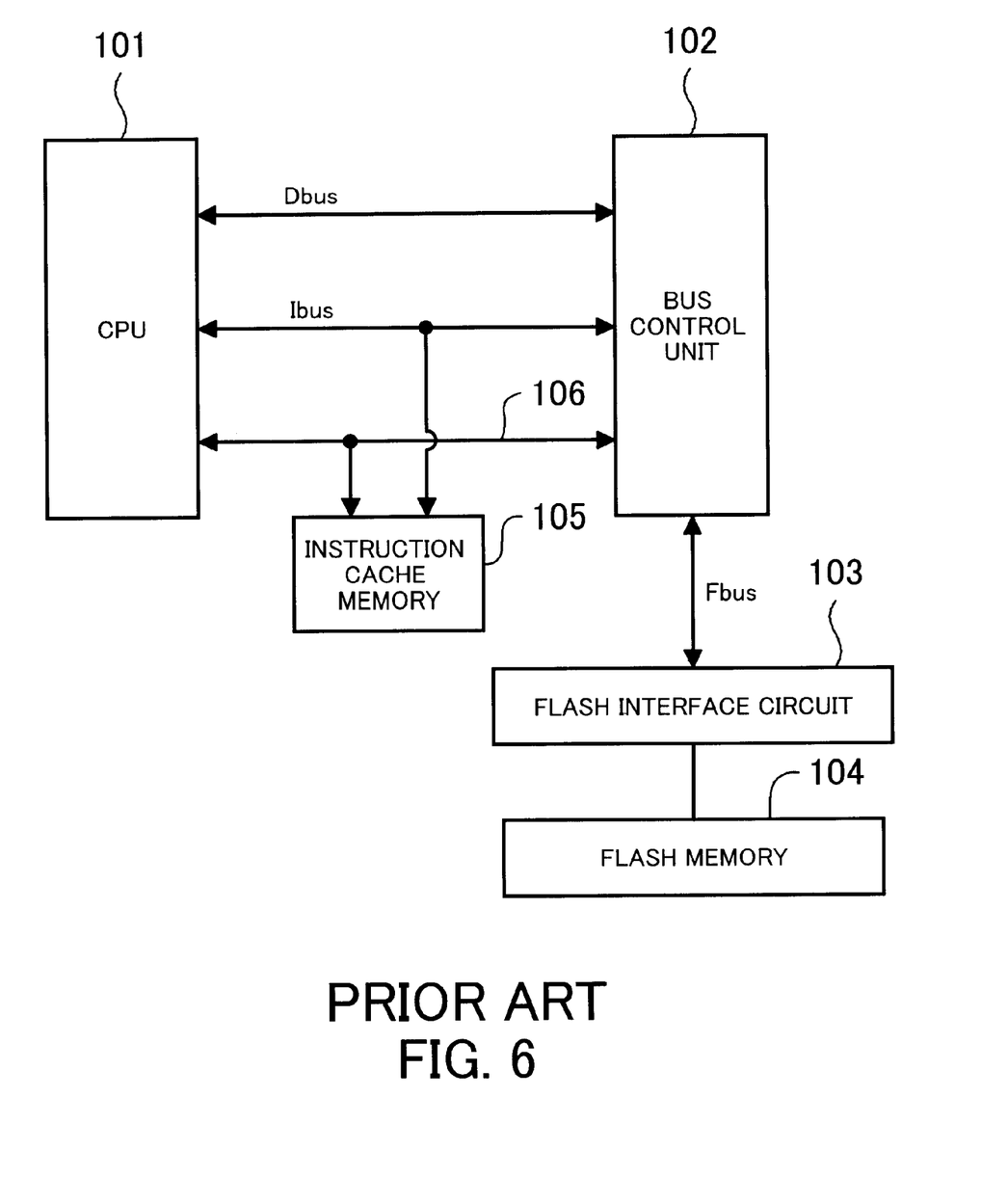
FIG. 6 is a block diagram of a configuration of a conventional microcontroller.

FIG. 6 is a block diagram of a structure of a conventional microcontroller. A description will be given of an exemplary case where a flash memory is used as a memory built in the microcontroller.

The conventional structure of the microcontroller is equipped with a CPU (Central Processing Unit) 101, which is connected to a bus control unit 102 through an instruction bus Ibus used exclusively for instructions and a data bus Dbus used exclusively for data, these buses being provided independently. The bus control unit 102 is connected to a flash interface circuit 103 through a flash memory bus Fbus. A flash memory 104 is connected to the flash interface circuit 103. An instruction cache memory 105 used to improve the efficiency of execution of instructions is connected to the instruction bus Ibus interposed between the CPU 101 and the bus control unit 102. A control line 106 used to transfer a cache control signal is connected to the CPU 101, the bus control unit 102 and the instruction cache memory 105.

The flash memory 104 is subjected to both the instruction access and the data access, and is thus connected to the flash memory bus Fbus, which is provided separately from the instruction bus Ibus and the data bus Dbus and is called a Princeton bus.

A description will be given, with reference to FIG. 7, of an operation of the microcontroller configured as described above.

Figure 7:
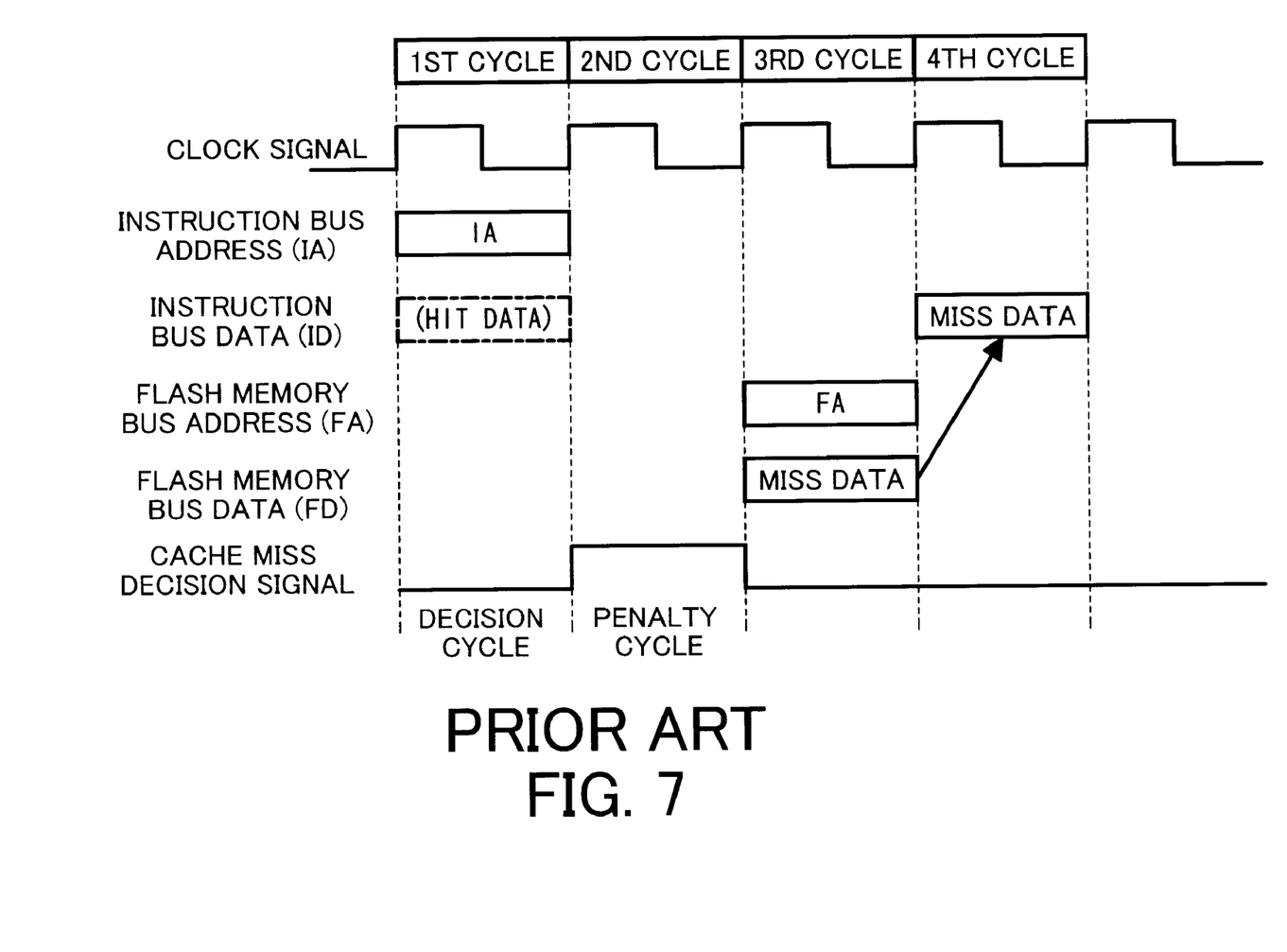
FIG. 7 is a timing chart of an instruction access operation of the conventional microcontroller shown in FIG. 6.

FIG. 7 is a timing chart of an instruction access operation of the microcontroller. More particularly, FIG. 7 shows a clock signal, an instruction bus address IA, instruction bus data ID, a flash memory bus address FA, flash memory bus data FD, and a cache miss decision signal, which are illustrated in that order from the top of FIG. 7.

An instruction access from the CPU 101 to the flash memory 104 is performed as follows. First, the CPU 101 outputs the instruction bus address IA to the instruction bus Ibus. When the cache hit occurs, in other words, when instruction bus data ID corresponding to the instruction bus address IA is available in the instruction cache memory 105, the flash memory 104 immediately responds to the instruction bus address IA. Thus, the cache-hit instruction bus data ID can be read from the instruction cache memory 105 in one cycle.

If the requested instruction bus data does not remain in the instruction cache memory 105, the CPU 101 must have access to the flash memory 104 again. At the time of accessing the instruction cache memory 105, a decision cycle is required to make a decision as to whether the requested instruction bus data is available in the instruction cache memory 105. When the cache miss occurs in the decision cycle, the cache miss decision signal is sent to the bus control unit 102 over the control line 106 in the second cycle. The bus control unit 102 acknowledges the cache miss decision signal, and outputs the flash memory bus address FA to the flash memory bus Fbus in the third cycle. That is, the bus control unit 102 acquires the instruction bus address IA in the second cycle, and outputs the flash memory address FA in the third cycle. Therefore, the outputting is delayed by one cycle, and the second cycle serves as a penalty cycle. The flash interface circuit 103 accesses the flash memory 104 in the fourth cycle, from which the flash memory bus data, which is cache-missed data, is read out to the flash memory bus Fbus. The flash memory bus data FD thus read is the instruction bus data ID. As described above, it takes four cycles for the requested instruction bus data ID to become available when the cache miss occurs, while it takes only one cycle when the cache hit occurs.

Figure 8:
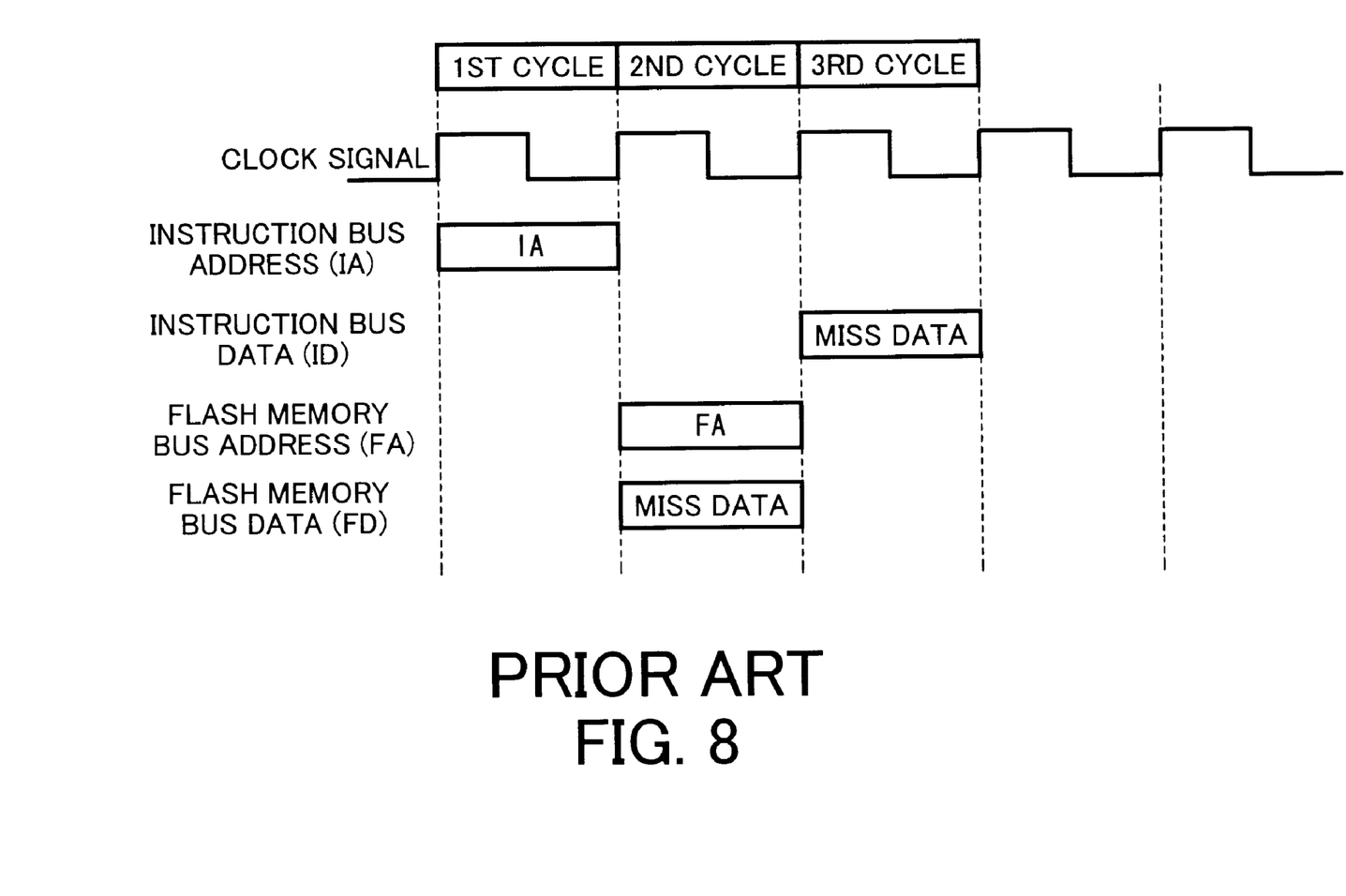
FIG. 8 is a timing chart of an instruction access operation performed in a circuit configuration that does not have an instruction cache memory.

In a comparative structure in which the instruction cache memory is not employed, the flash memory 104 is accessed for each instruction access. In addition, since the penalty cycle is not required, it is enough to have three cycles to complete the instruction access. More particularly, as shown in FIG. 8, the instruction bus address IA is output in the first cycle, and the flash memory bus data FD specified by the flash memory bus address FA is acquired in the second cycle. In the third cycle, the flash memory bus data FD is acquired as the instruction bus data ID.

As described above, the bus control unit 102 needs the control time of two cycles in order to realize the high-speed circuit operation when the instruction access from the CPU 101 to the flash memory 104 is performed. Thus, it surely takes at least three cycles to complete the instruction access in the case where the instruction cache memory 105 is not employed. In contrast, in the case where the instruction cache memory 105 is employed in such a way as to be connected to the instruction bus Ibus in order to improve the efficiency of execution of instructions, it is possible to complete the instruction access in only one cycle when the cache hit occurs. However, the penalty cycle is added when a cache miss occurs, and thus it takes four cycles to complete the instruction access. In other words, the number of cycles at the time of the occurrence of a cache miss is one cycle larger than that it takes in the absence of the instruction cache memory 105. It may be conceivable to increase the capacity of the instruction cache memory 105 in order to improve the cache-hit rate. However, this needs a larger chip area and the cost of the microcontroller becomes higher.

As a method for having access to the flash memory access in only one cycle, a circuit configuration is known in which the flash memory is connected to the instruction bus. Such a configuration is shown in FIG. 9, which illustrates another conventional structure of the microcontroller.

Figure 9:
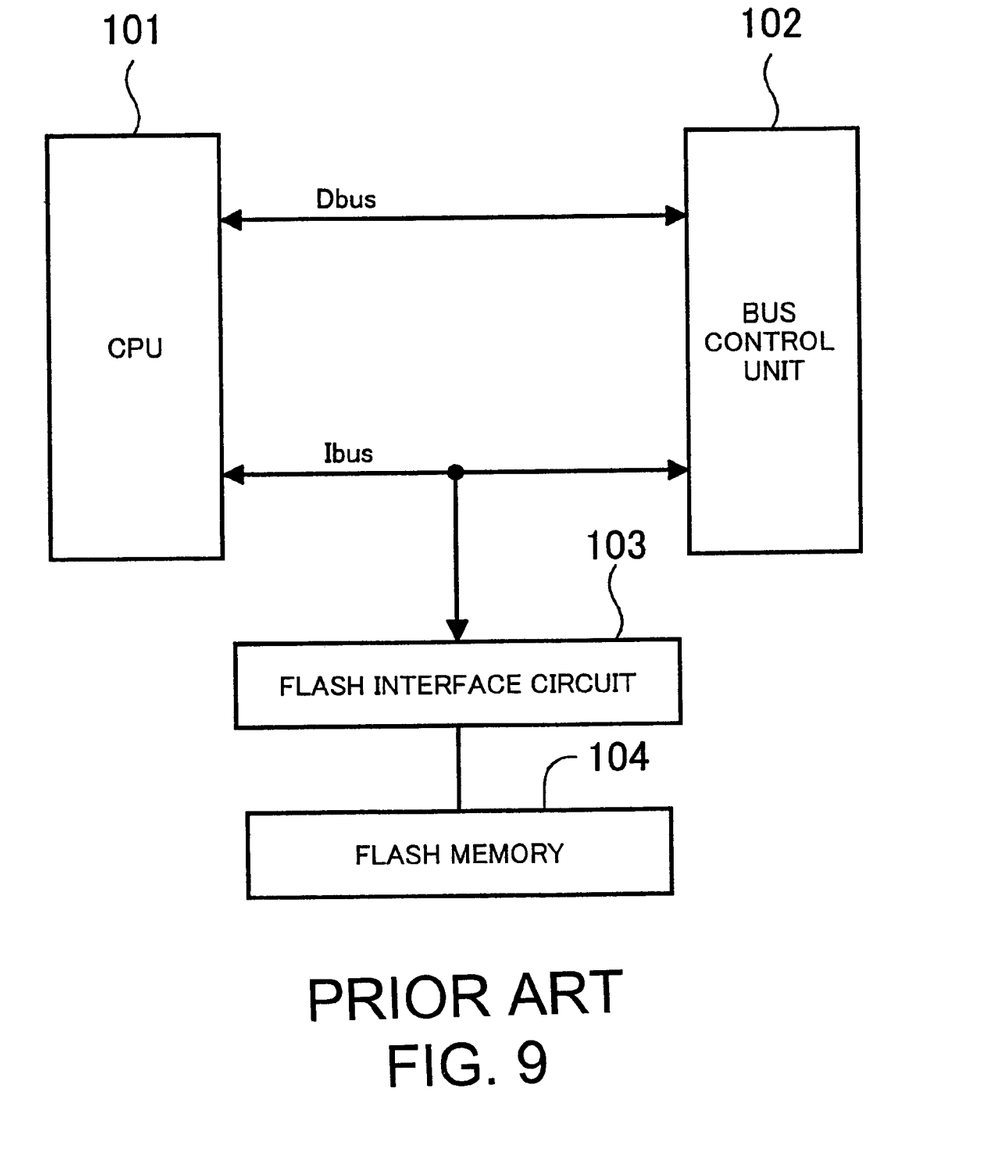
FIG. 9 is a block diagram of another configuration of the conventional microcontroller.

The microcontroller shown in FIG. 9 has the instruction bus Ibus to which the flash interference circuit 103 and the flash memory 104 are connected in such a way as to be closer to the CPU 101 than that shown in FIG. 6. With the above arrangement, the CPU 101 can access the flash memory 104 without the bus control unit 102, so that a one-cycle data access can be performed.

However, the arrangement with the flash memory connected to the instruction bus requires a modification of the bus protocol so as to make it possible to perform not only the instruction access to the flash memory but also the data access thereto. This is because the instruction bus is originally provided for instruction access only. In addition, the above arrangement requires a modification of the bus control unit, which makes the control thereof complex.

Furthermore, the above-mentioned arrangement loses the advantage of the high-speed circuit operation resulting from the separate arrangement of the instruction bus and the data bus. This is because the CPU cannot read any instruction during data access, and thus cannot perform instruction access.

SUMMARY OF THE INVENTION

Taking the above into consideration, an object of the present invention is to provide a microcontroller which has a structure installable in a conventional circuit configuration including a cache memory without any modification thereof and allows a central processing unit to have memory access in only one cycle.

To accomplish the above object, according to the present invention, there is provided a microcontroller having an instruction cache control function including: a central processing unit; a bus control unit connected to the central processing unit through an instruction bus and a data bus provided independently; a memory interface circuit receiving the instruction bus and a memory bus extending from the bus control unit and controlling an instruction access via the instruction bus and a data access via the memory bus; and a memory subjected to the instruction access and the data access via the memory interface circuit.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

First, a description will be given of an outline of the present invention with reference to the .accompanying drawings.

Figure 1:
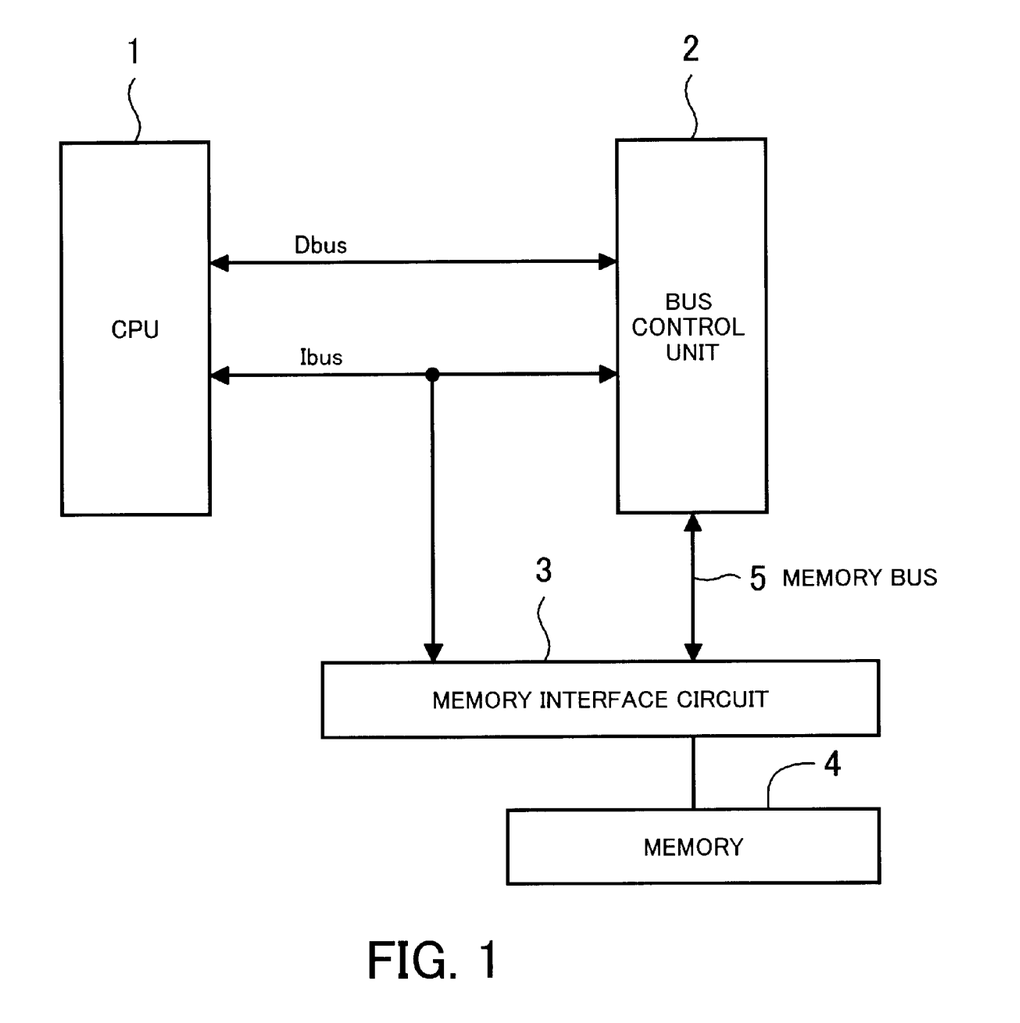
FIG. 1 is a block diagram illustrating a principal structure of a microcontroller according to the present invention.

FIG. 1 is a diagram instructing a principal structure of a microcontroller according to the present invention.

The microcontroller shown in FIG. 1 includes a CPU 1, a bus control unit 2, a memory interface circuit 3, and a memory 4. The CPU 1 and the bus control unit 2 are connected through an instruction bus Ibus used exclusively for instructions and a data bus Dbus used exclusively for data, there buses being provided independently. The memory interface circuit 3 is connected to the instruction bus Ibus connected between the CPU 1 and the bus control unit 2, and is also connected to a memory bus 5 extending from the bus control unit 2. The memory interface circuit 3 is connected to the memory 4.

A description will be given of a case where an instruction bus address output to the instruction bus Ibus from the CPU 1 is involved in an access to the memory 4. In this case, the CPU 1 accesses the memory 4 via the memory interface circuit 3. The memory 4 stores instruction bus data corresponding to the instruction bus address. Thus, the instruction bus data can be read in one cycle.

As described above, when the instruction bus address on the instruction bus Ibus is involved in an access to the memory 4, the memory 4 is directly accessed via the memory interface circuit 3 in such a way as to bypass the bus control unit 2. This is the same operation as that performed when the cache hit occurs in the conventional configuration with the instruction cache memory. In addition, the cache miss does not occur in the direct instruction access to the memory 4, and the cache hit is 100 percent ensured. Thus, the one-cycle access to the memory 4 is allowed, and the penalty cycle performed when the cache miss does not occur. This results in improved efficiency of execution of the instruction.

Further, the memory interface circuit 3 can easily be incorporated into the microcontroller as a substitution of the instruction cache memory without any modification of the peripheral circuits of the CPU 1, and the bus control unit 2 and the bus protocol.

A description will be given of a microcontroller equipped with, as the memory 4, a flash memory according to an embodiment of the present invention.

Figure 2:
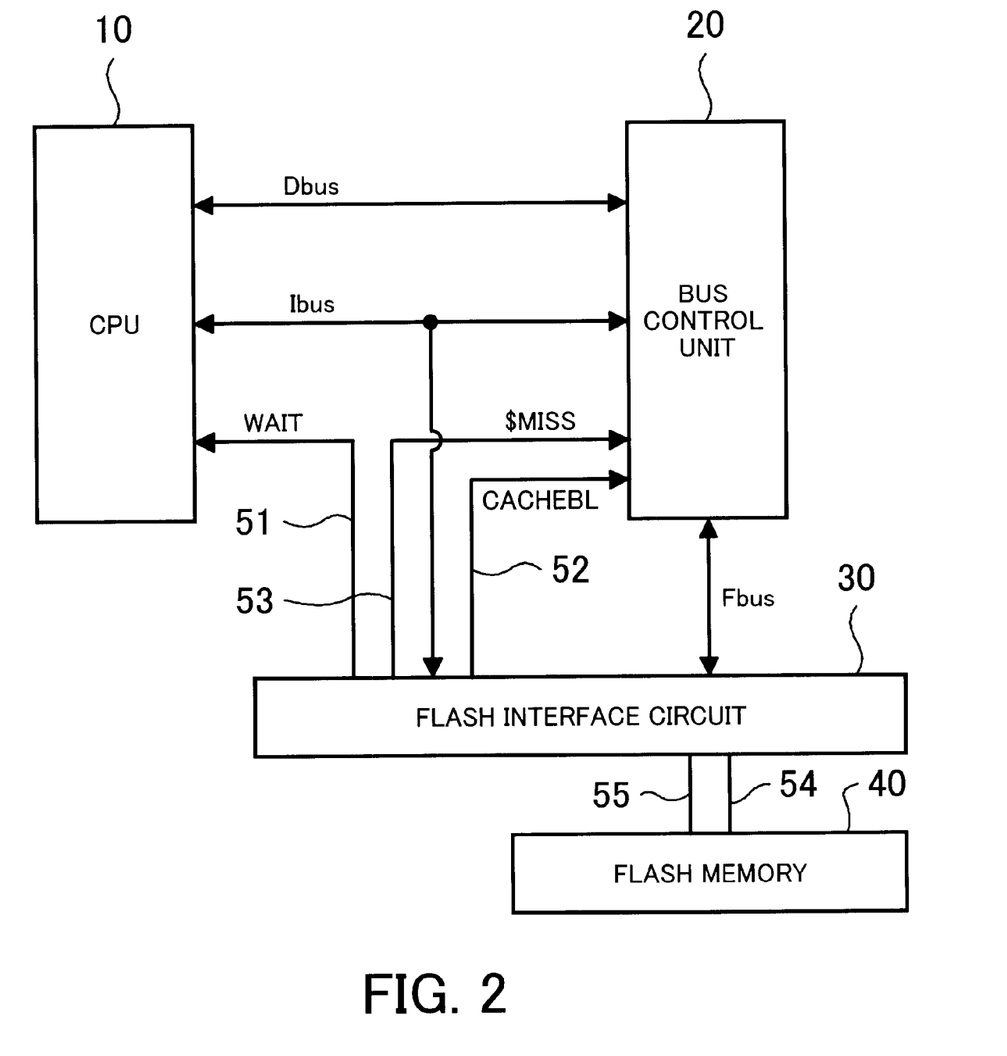
FIG. 2 is a block diagram of a circuit configuration of a microcontroller according to an embodiment of the present invention.

FIG. 2 is a block diagram of a circuit configuration of the above microcontroller. The microcontroller is made up of a CPU 10, a bus control unit 20, a flash interface circuit 30, and a flash memory 40. Preferably, this microprocessor is formed by a single integrated circuit as a whole.

An instruction bus Ibus used exclusively for instructions and a data bus used exclusively for data are connected between the CPU 10 and the bus control unit 20. The instruction bus Ibus is also connected to the flash interface circuit 30. Control lines 51, 52 and 53 for transferring cache control signals are connected to the CPU 10, the bus control unit 20 and the flash interface circuit 30. More particularly, the control line 51 is used to send a wait signal WAIT from the flash interface circuit 30 to the CPU 10. The control lines 52 and 53 are respectively used to send a cache enable signal CACHEBL and a cache miss decision signal $MISS from the flash interface circuit 30 to the bus control unit 20. The flash interface circuit 30 is connected to the bus control unit 20 by a flash memory bus Fbus, and to the flash memory 40 by a control line 54 and a data line 55, which lines carry a flash memory control signal and memory data, respectively. Although not illustrated, the bus control unit 20 is configured so as to be connected to an external memory other than the flash memory 40 and to a direct memory access controller which makes it possible for a peripheral device to directly access the flash memory 40 without the CPU 10.

Figure 3:
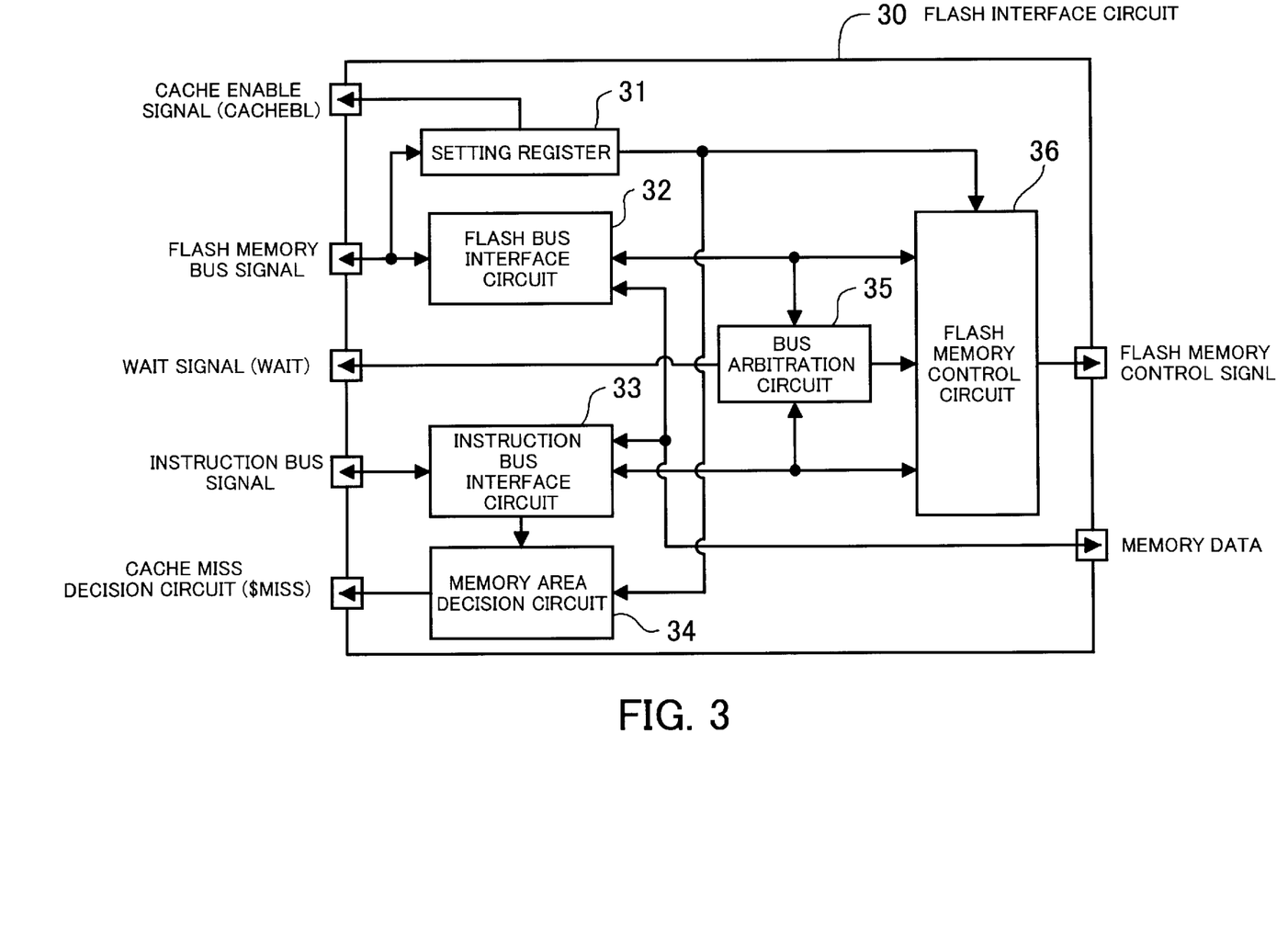
FIG. 3 is a block diagram of a circuit configuration of a flash interface circuit shown in FIG. 2.

FIG. 3 is a block diagram of a circuit configuration of the flash interface circuit 30.

The flash interface circuit 30 is made up of a setting register 31, a flash bus interface circuit 32, an instruction bus interface circuit 33, a memory area decision circuit 34, a bus arbitration circuit 35, and a flash memory control circuit 36. The setting register 31 and the flash bus interface circuit 32 are connected to the flash memory bus Fbus. The instruction bus interface circuit 33 is connected to the instruction bus Ibus. The memory area decision circuit 34, which is connected to the instruction bus interface circuit 33, determines whether an access received is directed to the flash memory 40. The bus arbitration circuit 35 performs bus arbitration when a data access from the flash memory bus Fbus and an instruction access from the instruction bus Ibus concurrently occur. The flash memory control circuit 36 acquires a flash memory bus signal of the flash bus interface circuit 32 and an instruction bus signal of the instruction bus interface circuit 33, and thus produces a control signal to be sent to the flash memory 40.

The setting register 31 is used to set either an instruction access via the flash interface circuit 30 without passing through the bus control unit 20 or an instruction access via the bus control unit 20. The setting of the setting register 31 is performed by a data access via the flash memory bus Fbus. For example, when the cache enable signal CACHEBL set in the setting register 31 is a high-level logic signal, the setting register 31 notifies the bus control unit 20 of the instruction access without the bus control unit 20. When the cache enable signal CACHEBL is a low-level logic signal, the setting register 31 notifies the bus control unit 20 of the instruction access via the bus control unit 20. Further, in this case, the low-level cache enable signal CACHEBL inhibits the flash memory control circuit 36 from accepting the instruction bus signal from the instruction bus interface circuit 33 and disables the memory area decision circuit 34.

The bus arbitration circuit 35 controls the flash memory control circuit 36 to give priority to the data access over the flash memory bus Fbus when the flash bus interface circuit 32 receives a data access and simultaneously the instruction bus interface circuit 33 receives an instruction access. With respect to the instruction access over the instruction bus Ibus, the bus arbitration circuit 35 outputs the wait signal WAIT to the CPU 10.

The flash interface circuit 30 is configured so that it supplies memory data read out from the flash memory 40 to the flash bus interface circuit 32 or the instruction bus interface circuit 33.

Figure 4:
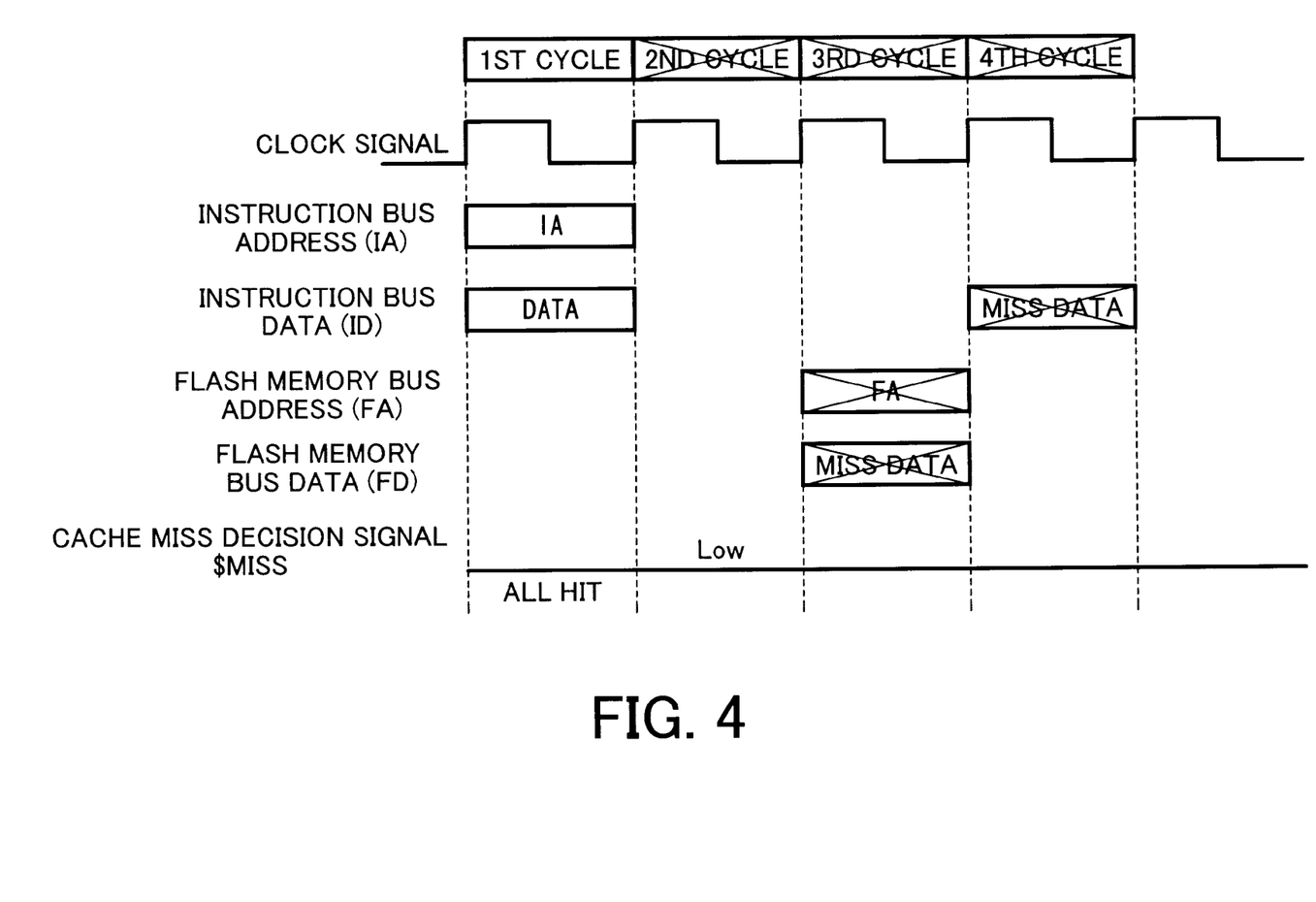
FIG. 4 is a timing chart of an instruction access operation of the microcontroller according to the embodiment of the present invention.

FIG. 4 is a timing chart of an instruction access operation of the microcontroller.

When the CPU 10 outputs the instruction bus signal to the instruction bus Ibus, the instruction bus signal is received by the instruction bus interface circuit 33 of the flash interface circuit 30. The memory area decision signal 34 refers to the instruction bus signal received by the instruction bus interface circuit 33, and determines whether it is an access to the flash memory 40.

When the memory area decision circuit 34 determines that the instruction bus signal is an access to the flash memory 40, the memory area decision circuit 34 sends the cache miss decision signal $MISS which is at the low level to the bus control unit 20, which invalidates the access to the flash memory 40 via the bus control unit 20. The above determination allows the instruction bus interface circuit 33 of the flash interface circuit 30 to accept the instruction bus signal. Then, the flash memory 40 is accessed via the flash memory control circuit 36 of the flash interface circuit 30, and associated instruction bus data ID is output to the instruction bus Ibus in one cycle. That is, for the instruction access to the flash memory 40, the flash memory 40 is accessed via the flash interface circuit 30 while the bus control unit 20 is bypassed. The above instruction access is equivalent to the operation of the conventional circuit configuration including the cache memory performed when the instruction cache memory is accessed and the cache hit occurs.

The cache hit surely occurs for each instruction access to the flash memory 40. Since the hit miss as shown in FIG. 4 does not occur, the penalty cycle does not take place and the instruction access via the bus control unit 20 is not performed.

Furthermore, the conventional circuit configuration with the instruction cache memory and the peripheral circuit configuration handling the cache control signal can be used as they are. Thus, the flash interface circuit 30 can be incorporated without any modification of the conventional bus protocol and the peripheral circuits.

A data access to the flash memory 40 is performed via the data bus Dbus, the bus control unit 20, the flash memory bus Fbus and the flash interface circuit 30 in that order.

The flash interface circuit 30 receives both the instruction bus Ibus and the flash memory bus Fbus. The flash memory bus Fbus carries an access coming from the bus control unit 20 via the data bus Dbus. Thus, there is a possibility that the flash interface circuit 30 concurrently may receive the instruction access and the data access. The microcontroller performs the following bus arbitration operation on the concurrence of the instruction access and the data access.

Figure 5:
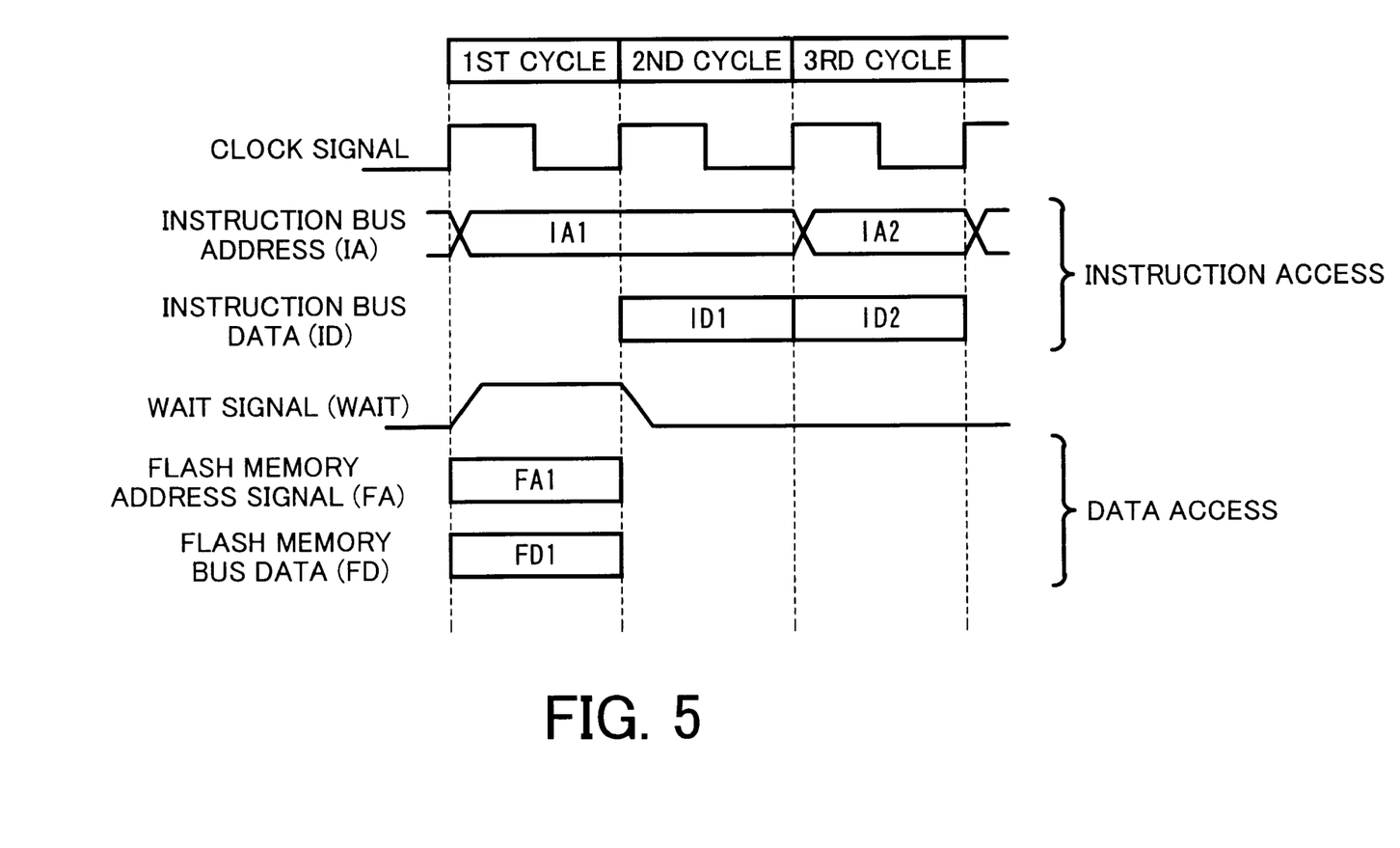
FIG. 5 is a timing chart of an instruction access for explaining a bus arbitration operation of the microcontroller according to the embodiment of the present invention.

FIG. 5 is a timing chart of an instruction access for explaining the bus arbitration operation of the microcontroller.

FIG. 5 shows that, within an identical cycle, the instruction bus interface circuit 33 receives an instruction bus address IA1 from the CPU 10, and the flash bus interface circuit 32 receives a flash memory bus address FA1 for a data access from the bus control unit 20. In this case, the bus arbitration circuit 35 performs a bus arbitration operation in such a way as to make the instruction access wait and process the data access in preference thereto. That is, the bus arbitration circuit 35 sends the wait signal WAIT to the CPU 10, which is thus caused to continuously output the instruction bus address IA1. During that cycle, flash memory bus data FD1 corresponding to the flash memory bus address FA1 is read out from the flash memory 40.

In the next cycle following the end of the data access, the wait signal WAIT is no longer output, and instruction bus data ID1 corresponding to the instruction bus address IA1, which is continuously output is read out from the flash memory 40.

If an instruction bus address IA2 is output in the next cycle, the example illustrated in FIG. 5 does not have a data access, and thus instruction bus data ID2 corresponding to the instruction bus address IA2 can be read from the flash memory 40 in the same cycle.

The foregoing describes the preferred embodiments of the present invention. However, the present invention is not limited to the specifically described embodiments, and variations and modifications may be made within the scope of the present invention. For example, although the preferred embodiments of the present invention described in the foregoing employ the flash memory as the cache memory, the present invention can be applied to other types of memories.

As described above, the present invention has the unique configuration in which the memory interface circuit connectable to the instruction bus and the memory bus is arranged in the position in which the instruction cache memory is arranged in the conventional microcontroller. Thus, the memory interface circuit can be incorporated into the cache-installable circuit configuration without any modification thereof and the bus protocol. Further, for each instruction access, the present invention operates in the same manner as that performed when the cache hit occurs in the circuit with the cache memory. In other words, the cache miss does not occur at all. Thus, the penalty cycle is not needed and the instruction access can be made in one cycle. It is therefore possible to improve the access efficiency for instructions and enhance the instruction processing performance of the microcontroller.

The foregoing is considered as illustrative only of the principles of the present invention. Further, since numerous modifications and changes will readily occur to those skilled in the art, it is not desired to limit the invention to the extract construction and applications shown and described, and accordingly, all suitable modifications and equivalents may be regarded as falling within the scope of the invention in the appended claims and their equivalents.

What is claimed is:

1. A microcontroller having an instruction cache control function, comprising:

a central processing unit;

a bus control unit connected to said central processing unit through an instruction bus and a data bus provided independently;

a memory interface circuit receiving the instruction bus and a memory bus extending from said bus control unit and controlling an instruction access via the instruction bus and a data access via the memory bus; and a memory subjected to the instruction access and the data access via said memory interface circuit, wherein said memory interface circuit performs the instruction access to said memory via the instruction bus, and performs the data access to said memory via the memory bus.

2. A microcontroller having an instruction cache control function, comprising:

a central processing unit;

a bus control unit connected to said central processing unit through an instruction bus and a data bus provided independently;

a memory interface circuit receiving the instruction bus and a memory bus extending from said bus control unit and controlling an instruction access via the instruction bus and a data access via the memory bus; and a memory subjected to the instruction access and the data access via said memory interface circuit, wherein said memory interface circuit comprises:

a first bus interface circuit receiving the memory bus;

a second bus interface circuit receiving the instruction bus;

a bus arbitration circuit arbitrating two bus signals of said first bus interface circuit and said second bus interface circuit; and a memory control circuit receiving the two bus signals arbitrated and producing a control signal to be supplied to said memory.

3. The microcontroller as claimed in claim 2, wherein said bus arbitration circuit sends a wait signal to said central processing unit to make the instruction access therefrom wait when said first bus interface circuit receives the data access via the memory bus and concurrently said second bus interface circuit receives the instruction access via the instruction bus.

4. The microcontroller as claimed in claim 2, wherein said memory interface circuit comprises a memory area decision circuit outputting a cache miss decision signal to said bus control unit when the instruction access received by said second bus interface circuit via the instruction bus is an access to said memory.

5. The microcontroller as claimed in claim 2, wherein said memory interface circuit comprises a setting register storing a signal indicating whether the instruction access to said memory should be performed via said memory interface circuit.

6. The microcontroller as claimed in claim 5, wherein said signal is set in the setting register by the data access via the memory bus, said signal being supplied to said bus control unit as a cache enable signal.

* * * * *